United States Patent [19]

Dyke

[11] Patent Number: 4,910,776
[45] Date of Patent: Mar. 20, 1990

[54] ENCRYPTION PRINTED CIRCUIT BOARD

[75] Inventor: John Dyke, West Valley, Utah

[73] Assignee: MIU Automation, Salt Lake City, Utah

[21] Appl. No.: 314,916

[22] Filed: Feb. 24, 1989

[51] Int. Cl.[4] .......................... H04K 1/00; H04K 9/00; H04L 9/02
[52] U.S. Cl. ........................................... 380/25; 380/4; 380/21; 380/23; 380/29; 380/44; 380/49
[58] Field of Search .................. 380/4, 21, 23, 25, 29, 380/44, 49

[56] References Cited

U.S. PATENT DOCUMENTS

| | | | |
|---|---|---|---|
| 3,764,742 | 10/1923 | Abbott et al. | 380/23 |
| 4,123,747 | 10/1978 | Lancto et al. | 380/29 |
| 4,262,329 | 4/1981 | Bright et al. | 364/200 |
| 4,465,901 | 8/1984 | Best | 380/4 |
| 4,503,287 | 3/1985 | Morris et al. | 380/49 |
| 4,588,991 | 5/1986 | Atalla | 380/25 |
| 4,670,857 | 6/1987 | Rackman | 380/23 |
| 4,802,217 | 1/1989 | Michener | 380/29 |
| 4,827,508 | 5/1989 | Shear | 380/4 |

Primary Examiner—Stephen C. Buczinski
Attorney, Agent, or Firm—Hubbard, Thurman, Turner, Tucker & Harris

[57] ABSTRACT

A host computer add on encryption/decryption printed circuit board includes address and control buffers, data buffer and board decode logic having input and output terminals selectively connected to the host computer and to first ports of a dual port random access memory (DPR) for storing a block of data and addresses and inputting portions of the block of data and addresses into the DPR's memory. A central processing unit (CPU) is connected to second ports of the DPR, and to a CPU RAM, CUP ROM, real time clock, key image buffer, and DES encryption device. The CUP pursuant to commands of the host computer fetches: (1) the encryption/decryption key of the key image buffer and information from the DPR for encryption/decryption by the encryption/decryption device; (2) the name from the host computer and date, time and length of access time for accumulating an audit trail stored in the key image buffer; and (3) file, auditor, and supervisor identification keys from key image buffer, and host computer for encryption and after comparison allowing access only to those files associated with these keys. In addition a system station key can be included for encryption and comparison for limiting user access only through an assigned station. A wait generator is connected to the CPU, real time clock and encryption/decryption device for clock synchronization of joint operations.

10 Claims, 13 Drawing Sheets

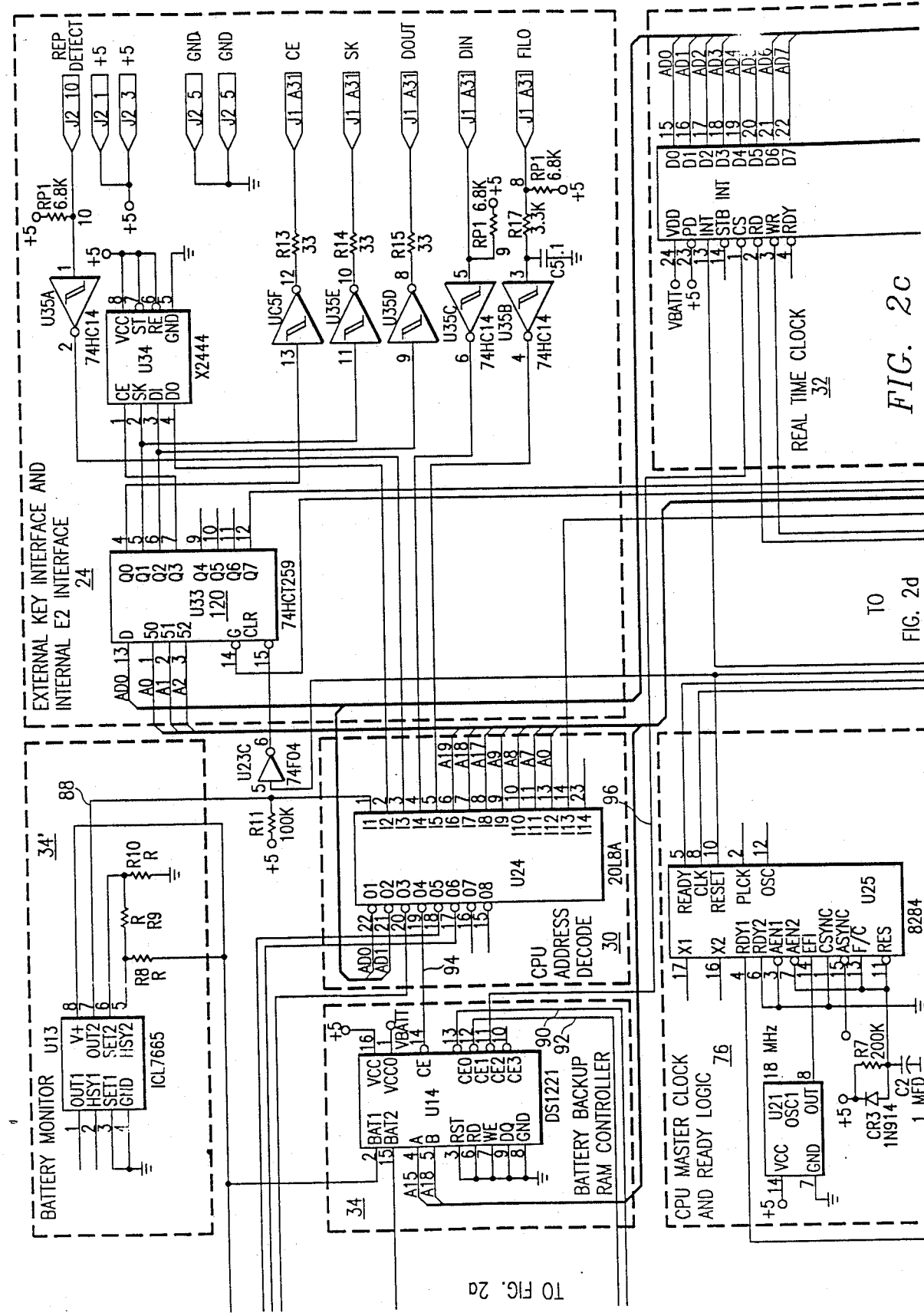

COMMAND LIST

- A.(A.') SOFTWARE RESET

ISSUE SOFTWARE RESET COMMAND TO THE DES CHIP

- B.(B.') LOAD DES MASTER KEY

LOAD THE DES MASTER KEY REGISTER WITH DATA FROM THE DPR

- C.(C.') ENCRYPT MASTER KEY

ENCRYPT DATA IN THE DPR USING THE DES MASTER KEY REGISTER

- D. LOAD CLEAR E KEY

LOAD THE DES ENCRYPTION KEY REGISTER WITH A CLEAR KEY FROM THE DPR

- (D.') LOAD CLEAR D KEY

LOAD THE DES DECRYPTION KEY REGISTER WITH A CLEAR KEY FROM THE DPR

- E. LOAD ENCRYPTED E KEY

LOAD THE DES ENCRYPTION KEY REGISTER WITH AN ENCRYPTED KEY FROM THE DPR

- (E.') LOAD ENCRYPTED D KEY

LOAD THE DES DECRYPTION KEY REGISTER WITH AN ENCRYPTED KEY FROM THE DPR

- F. LOAD CLEAR IVE

LOAD THE DES ENCRYPTION IV REGISTER WITH A CLEAR IV FROM THE DPR

- (F.') LOAD CLEAR IVD

LOAD THE DES DECRYPTION IV REGISTER WITH A CLEAR IV FROM THE DPR

- G. LOAD ENCRYPTED IVE

LOAD THE DES ENCRYPTION IV REGISTER WITH AN ENCRYPTED IV FROM THE DPR

FIGURE 3E (G.')  LOAD ENCRYPTED IVD

LOAD THE DES DECRYPTION IV REGISTER WITH AN ENCRYPTED IV FROM THE DPR

H.  READ CLEAR IVE

SEND THE DES ENCRYPTION IV REGISTER WITH AN ENCRYPTED IV FROM THE DPR (H.')  READ CLEAR IVD

SEND THE DES DECRYPTION IV REGISTER CLEAR TO THE DPR

I.  READ ENCRYPTED IVE

SEND THE DES ENCRYPTION IV REGISTER ENCRYPTED TO THE DPR (I.')  READ ENCRYPTED IVD

SEND THE DES DECRYPTION IV REGISTER ENCRYPTED TO THE DPR

J.(J.')  KEY PRESENT

SEND THE PHYSICAL KEY PRESENT STATUS TO THE DPR

K.(K.')  KEY CHANGED

SEND THE KEY READ FLAG TO THE DPR

L.(L.')  WRITE PHYSICAL KEY

WRITE THE PHYSICAL KEY FROM THE KIB

M.(M.')  READ PHYSICAL KEY

READ THE PHYSICAL KEY TO THE KIB

N.(N.')  CLEAR AUDIT TRAIL

CLEAR THE AUDIT TRAIL POINTERS

O.(O.')  WRITE AUDIT TRAIL

WRITE TO THE NEXT AUDIT TRAIL BUFFER LOCATION FROM THE DPR

P.(P.')  RESET AUDIT TRAIL

RESET THE AUDIT TRAIL READ POINTER

FIGURE 3E (CONTINUED)

Q.(Q.')   READ AUDIT TRAIL

READ FROM THE NEXT AUDIT TRAIL BUFFER LOCATION TO THE DPR

R.(R.')   WRITE NAME

LOAD THE USER NAME IN THE KIB FROM THE DPR

S.(S.')   READ NAME

SEND THE USER NAME IN THE KIB TO THE DPR

T.(T.')   WRITE PASSWORD

LOAD THE USER PASSWORD IN THE KIB FROM THE DPR

U.(U.')   VALID PASSWORD

COMPARE THE USER PASSWORD IN THE KIB TO THE DPR

V.(V.')   WRITE FLAGS

LOAD THE USER FLAGS IN THE KIB FROM THE DPR

W.(W.')   READ FLAGS

SEND THE USER FLAGS IN THE KIB TO THE DPR

X.(X.')   WRITE ID CODE

LOAD THE USER ID CODE IN THE KIB FROM THE DPR

Y.(Y.')   READ ID CODE

SEND THE USER ID CODE IN THE KIB TO THE DPR

Z.(Z.')   WRITE USER KEY

LOAD THE USER PRIMARY KEY AND IV IN THE KIB FROM THE DPR

AA.       LOAD USER KEY

LOAD THE DES ENCRYPTION KEY REGISTER FROM THE USER PRIMARY KEY IN THE KIB

LOAD THE DES ENCRYPTION IV REGISTER FROM THE USER PRIMARY IV IN THE KIB

AA.'      LOAD USER KEY

LOAD THE DES DECRYPTION KEY REGISTER FROM THE USER PRIMARY KEY IN THE KIB

FIGURE 3E (CONTINUED)

LOAD THE DES DECRYPTION IV REGISTER FROM THE USER PRIMARY IV IN THE KIB

BB.(BB.') CREATE USER AUDIT KEY

LOAD THE USER AUDIT KEY IN THE KIB FROM THE DPR
ENCRYPT THE USER AUDIT KEY IN THE KIB USING THE AUDIT REGISTER

CC.(CC.') READ USER AUDIT KEY

SEND THE USER AUDIT KEY (ENCRYPTED) TO THE DPR

DD.(DD.') LOAD USER AUDIT KEY

LOAD THE DES MASTER KEY FROM THE AUDIT REGISTER
LOAD THE DES ENCRYPTION KEY REGISTER WITH AN ENCRYPTED KEY FROM THE DPR
LOAD THE DES DECRYPTION KEY REGISTER WITH AN ENCRYPTED KEY FROM THE DPR

EE.(EE.') CREATE USER MASTER KEY

LOAD THE USER MASTER KEY IN THE KIB FROM THE DPR
ENCRYPT THE USER MASTER KEY IN THE KIB USING THE MASTER REGISTER

FF.(FF.') READ USER MASTER KEY

SEND THE USER MASTER KEY (ENCRYPTED TO THE DPR

GG.(GG.') LOAD USER MASTER KEY

LOAD THE DES MASTER KEY FROM THE MASTER REGISTER
LOAD THE DES ENCRYPTION KEY REGISTER WITH AN ENCRYPTED KEY FROM THE DPR
LOAD THE DES DECRYPTION KEY REGISTER WITH AN ENCRYPTED KEY FROM THE DPR

HH.(HH.') WRITE AUDIT KEY (AUDITOR KEYS ONLY)

LOAD THE AUDIT KEY IN THE KIB FROM THE DPR

II.(II.') SAVE AUDIT KEY (AUDITOR KEYS ONLY)

LOAD THE AUDIT REGISTER WITH THE AUDIT KEY IN THE KIB

JJ.(JJ.') COPY AUDIT KEY (AUDITOR KEYS ONLY)

LOAD THE AUDIT KEY IN THE KIB WITH THE AUDIT REGISTER

KK.(KK.') LOAD AUDIT KEY (AUDITOR KEYS ONLY)

FIGURE 3E (CONTINUED)

ENCRYPT DATA IN THE DPR USING THE COUNT AND MODE SUPPLIED BY THE DPR (TT.') DECRYPT DATA (VIA THE DES CHIP)

DECRYPT DATA IN THE DPR USING THE COUNT AND MODE SUPPLIED BY THE DPR

UU.(UU.') VALID KEY

CHECKSUM THE KIB AND VERIFY IF CORRECT TO THE DPR

VV.(VV.') WRITE CLOCK (IF RTC PRESENT)

LOAD THE RTC FROM THE DPR

WW.(WW.') READ CLOCK (IF RTC PRESENT)

SEND THE RTC TO THE DPR

XX.(XX.') WRITE AUX KEY

LOAD THE USER SECONDARY KEY AND IV IN THE KIB FROM THE DPR

YY. LOAD AUX KEY

LOAD THE DES ENCRYPTION KEY REGISTER FROM THE USER SECONDARY KEY IN THE KIB
LOAD THE DES ENCRYPTION IV REGISTER FROM THE USER SECONDARY IV IN THE KIB (YY.') LOAD AUX KEY

LOAD THE DES DECRYPTION KEY REGISTER FROM THE USER SECONDARY KEY IN THE KIB
LOAD THE DES DECRYPTION IV REGISTER FROM THE USER SECONDARY IV IN THE KIB

ZZ.(ZZ.') READ USER SYSTEM KEY

LOAD DES MASTER KEY WITH THE SYSTEM KEY IN THE KIB
SEND THE USER KEY IN THE KIB (ENCRYPTED WITH SYSTEM KEY) TO THE DPR

AAA.(AAA.') LOAD USER SYSTEM KEY

LOAD THE DES MASTER KEY FROM THE SYSTEM KEY IN THE KIB
LOAD THE DES ENCRYPTION KEY REGISTER WITH AN ENCRYPTED KEY FROM THE DPR
LOAD THE DES DECRYPTION KEY REGISTER WITH AN ENCRYPTED KEY FROM THE DPR

FIGURE 3E (CONTINUED)

|         | LOAD THE DES ENCRYPTION KEY REGISTER FROM THE AUDIT KEY IN THE KIB |
|---------|---|

LOAD THE DES ENCRYPTION KEY REGISTER FROM THE AUDIT KEY IN THE KIB

LOAD THE DES DECRYPTION KEY REGISTER FROM THE AUDIT KEY IN THE KIB

LL.(LL.')    WRITE MASTER KEY (SUPERVISOR KEYS ONLY)

LOAD THE MASTER KEY IN THE KIB FROM THE DPR

MM.(MM.')    SAVE MASTER KEY (SUPERVISOR KEYS ONLY)

LOAD THE MASTER REGISTER WITH THE MASTER KEY IN THE KIB

NN.(NN.')    COPY MASTER KEY (SUPERVISOR KEYS ONLY)

LOAD THE MASTER KEY IN THE KIB WITH THE MASTER REGISTER

OO.    LOAD MASTER KEY (SUPERVISOR KEYS ONLY)

LOAD THE DES ENCRYPTION KEY REGISTER FROM THE MASTER KEY IN THE KIB (OO.')    LOAD MASTER KEY (SUPERVISOR KEYS ONLY)

LOAD THE DES DECRYPTION KEY REGISTER FROM THE MASTER KEY IN THE KIB

PP.(PP.')    WRITE SYSTEM KEY

LOAD THE SYSTEM KEY IN THE KIB FROM THE DPR

QQ.(QQ.')    SAVE SYSTEM KEY

LOAD THE SYSTEM REGISTER WITH THE SYSTEM KEY IN THE KIB

RR.(RR.')    COPY SYSTEM KEY

LOAD THE SYSTEM KEY IN THE KIB WITH THE SYSTEM REGISTER

SS.    LOAD SYSTEM KEY

LOAD THE DES ENCRYPTION KEY REGISTER FROM THE SYSTEM KEY IN THE KIB (SS.')    LOAD SYSTEM KEY

LOAD THE DES DECRYPTION KEY REGISTER FROM THE SYSTEM KEY IN THE KIB

TT.    ENCRYPT DATA (VIA THE DES CHIP)

FIGURE 3E (CONTINUED).

BBB.(BBB.')   WRITE CREATED DATE

LOAD THE USER CREATED DATE IN THE KIB FROM THE DPR

CCC.(CCC.')   READ CREATED DATE

SEND THE USER CREATED DATE IN THE KIB FROM THE DPR

FIGURE 3E (CONTINUED)

ENCRYPTION PRINTED CIRCUIT BOARD

BACKGROUND OF THE INVENTION

This application relates to U.S. Pat. No. 4,797,928 issued Jan. 10, 1989 to John Dyke.

This invention relates to cryptographic devices and more particularly to an improved encryption printed circuit board.

Various systems have been developed in the prior art for enciphering digital information to improve the security and privacy of data within data processing systems, during transmission over telecommunications networks, and during storage on media such as magnetic tape and disk. Examples of such cipher systems may be found in U.S. Pat. Nos. 3,798,359 and 3,958,081.

In known cipher systems the bits of the information to be enciphered are rearranged or replaced by substitute bits under control of a secret cipher key. To decipher the enciphered operation the substitution is reversed. Enciphering methods have been combined to provide secure ciphers. For example, the bits have been transposed prior to substitution, groups of bits have been substituted, combining using exclusive OR, and these techniques have been altered several times during the enciphering and deciphering process. Such cipher systems are practically unbreakable without testing all possible keys and the key can be made large enough to make such testing prohibitively time consuming.

Thus, for piracy to be profitable access to the key is necessary. Various systems have been devised to keep the key from being accessed through the computer. Such systems have included separating the enciphering system from the computer wherein the computer calls for information and gets the results only.

The essential difference between the known prior art devices and the invention of U.S. Pat. No. 4,797,928 is the provision of an encryption printed circuit which is an IBM half-sized printed circuit board with complete interface to a card reader. The technique used by the encryption printed circuit is known as the National Bureau of Standards Data Encryption Standard (DES) whose DES function is provided by a low cost, high performance integrated circuit having a microprocessor which automatically handles many of the DES functions. The use of the microprocessor unburdess the host system which provides greater transfer speed of information and increased security of the information.

Differences between the known prior art devices and the related invention of U.S. Pat. No. 4,797,928, and the present invention are the elimination of essentially all handshaking between the host computer and the ciphering printed circuit board; that is through the use of a dual port random access memory (DPR) only 1 byte in software is required after a connection is established between the two communicating devices, and the provision of an "audit trail" for determining who accesses the encryption printed circuit board, the time and date of access and how long the encryption printed circuit board is accessed.

SUMMARY OF THE INVENTION

Accordingly, it is an object of this invention to provide a secure and versatile encryption device.

Another object of the invention is to provide an encryption device employing an internationally known method for making secure corporate data bases, information stored on tape, floppy diskettes, and data communications.

Still another object of the invention is to provide a low cost, high performance encryption device capable of performing automatically many of the National Bureau of Standards Data Encryption Standard (DES) functions.

Yet another object of the invention is to provide an encryption device capable of preventing the linking together of different files in storage.

Still yet another object of the invention is to provide an encryption device usable to secure files on hard disk or floppy diskette as well as to protect data bases, information being transmitted to another site, and dial-up access.

A further object of the invention is to provide an encryption printed circuit board as an add on communication device to a host computer having substantially reduced handshaking requirements.

Still a further object of the invention is to provide an encryption printed circuit board having "audit trail" capabilities.

Briefly stated the encryption device constituting the subject matter of this invention includes a printed circuit board having a microprocessor connected to a ciphering processor. The ciphering processor encrypts and decrypts data using the National Bureau of Standards encryption algorithm. The printed circuit board is connected to a host computer through a dual port random access memory (RAM) for receiving portions of a block of clear or encrypted data which is to be run through the cipher processor. The key is read into the PC board from a card reader together with the name of the user whenever data is to be encrypted or decrypted, the data decrypted or encrypted as directed, and returned to the host processor. The PC board provides an audit trail by storing the name of the user, the time and date of use, and the length of time of the use. A secondary key is used to prevent linking together different files in storage. Supervisor keys are used to provide supervisors limited access to the stored information, and system keys are provided to limit user access to access only through assigned stations. As the host computer never "sees" the keys, the keys cannot be found in the memory of the host computer. The PC board provides a "audit trail" by storing the user's name, time and date of use, and length of time of the use.

BRIEF DESCRIPTION OF THE DRAWINGS

Other objects and features of the invention will become readily apparent from the following detailed description when read in conjunction with the drawings in which:

FIGS. 2A-2D show n greater detail a schematic diagram of the encryption printed circuit board.

FIGS. 3E is a command list of the software commands.

DETAILED DESCRIPTION OF THE PREFERRED EMBODIMENT

Figure 1:
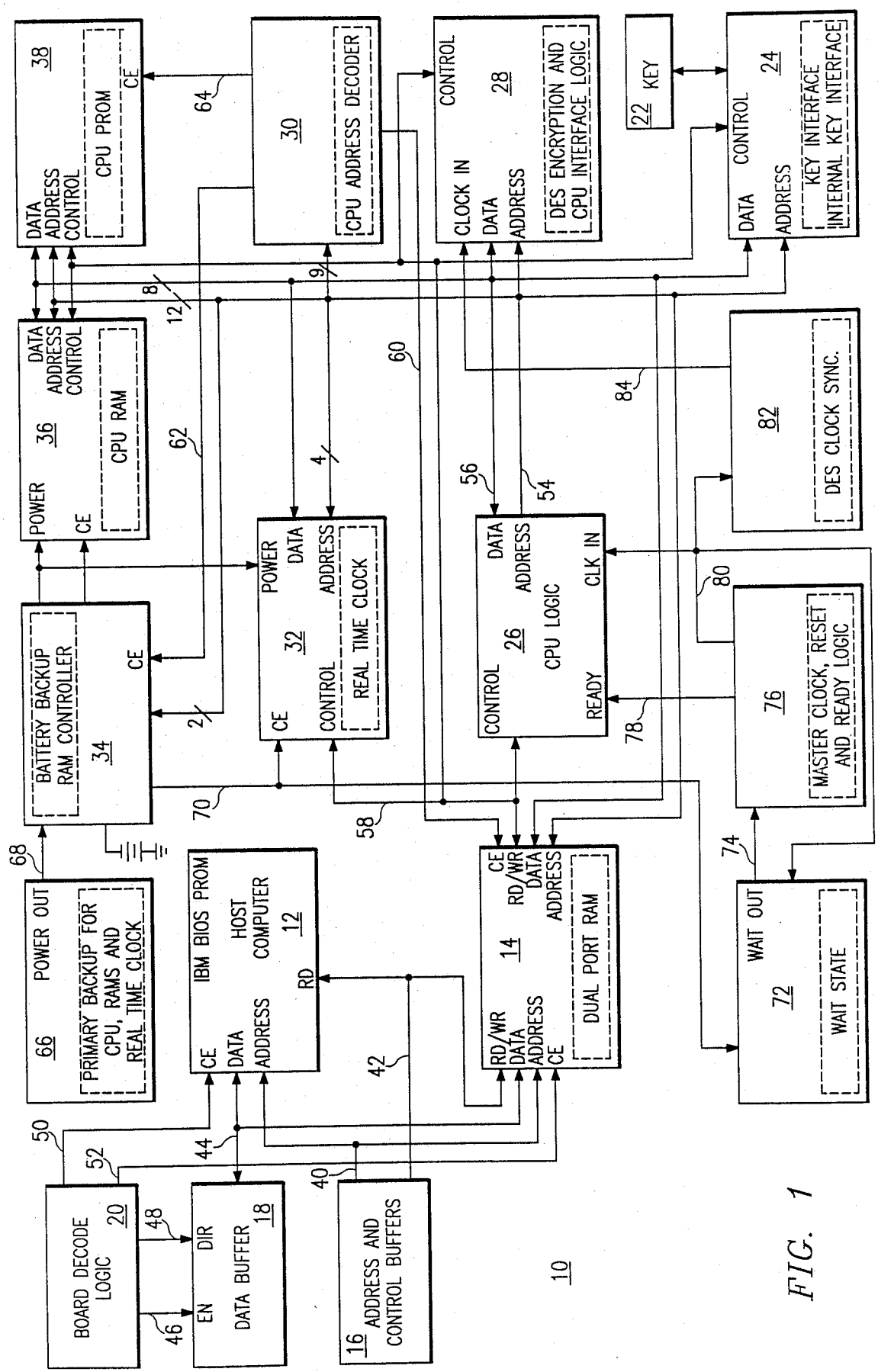
FIG. 1 constitutes a schematic diagram in block form of the encrypted printed circuit board of the present invention.

The encryption printed circuit board 10 (Figs. 1 and 2A-2D) includes a printed circuit board with complete interface to a card reader. The board is provided with a special software driver, and includes an initialization command. From that point on, encrypting or decrypting is performed by file. All programs are menu driven for ease of use.

The encryption printed circuit board PCB) can encrypt in either a binary code or in ASCII.

Binary encryption utilizes the conventional eight bit cipher feedback method designated by the National Bureau of Standards Data Encryption Standard (DES) used in most encrypters. It takes all clear data (unencrypted) and turns it into a stream of random characters, any one of which can be of any value between 00 and FF (256 possible combinatons). All data is encrypted, including control characters that may be used for MODEM and equipment control.

ASCII encryption is an implementation of cipher feedback called "Safe Talk". Safe Talk works by encrypting on "printable characters" and passes control characters through without encrypiion. Printed characters are in the 20 to 7E hexadecimal range. All "handshake", control and command characters are left untouched. "Safe Talk" mode of operation allows encryption to be used in places where conventional encryption is not suitable.

The encryption PCB is capable of a two mode operation. The first mode is a security mode used to secure the files on hard disk or floppy diskette. In this mode, individual files or entire diskettes are encrypted. The second mode of operation is an access or communications security device. This mode is used to protect data bases and information being transmitted to another site, and to prevent dial-up access. This protect mode requires only that all the communications be routed through the encryption PCB; the result is that all communications between host look like random data and cannot be understood.

The host computer may be, for example, an IBM Personal Computer which consists of the system unit, the keyboard, a display, and printer. The system unit contains a 16-bit microprocessor, rea-only memory (ROM), random access memory (RAM), power supply, speaker, and five expansion slots to allow easy expansion of the system. The system unit houses two floppy diskette drives attached thereto by a diskette adapter located in one of the five system-bus slots. The encryption PCB of the present invention is an adapter card located in one of the five system-bus slots. It is compatible with the IBM PC.

The encryption printed circuit board 10 (Fig. 1), hereinafter referred to as the PCB, includes first and second portions. The first portion is an interface between the host computer (for example IBM BIOS PROM) 12 and a first set of ports of a dual port RAM (DPR) 14 and includes in addition to the DPR 14, a plurality of address and control buffers 16, a data butter 18, and a board decode logic means 20 all having input address ports connected to the host computer. The first portions thus processes the data to be encrypted or decrypted from and to the host processor.

The second portion of the PCB is the encryption/decryption portion and includes beginning with a key card reader for entering a key in a memory 22 and ending with the second set of pors of the DPR 14. In addition to the key memory 22 and DPR 1, the second portion includes an internal key interface 24, central processing unit logic means 26, DES encryption and CPU interface logic means 28, CPU address decoder 30, real time clock 32, battery backup RAM controller 34, CPU RAM 36, and CPU PROM 38.

With respect to the first portion of the PCB, the address and control buffers 16 are connected by leads 40 and 42, respectively, to the address terminals of the host computer 12 and DPR 14, and to the read terminal of the host computer 12 and read/write terminal of the DPR 14 for storing and correlating addresses of incoming and outgoing information and controlling the input and output of data (information). The data buffer 18 is connected by lead 44 to the data terminals of the host computer 12 and the DPR 14 for storing incoming and outgoing data (information). While, the board decode logic 20 i connected by leads 46 and 48, respectively, to the enable and direction terminals of the data buffer 18 and by leads 50 and 52, respectively, to the chip enable terminals of the host computer 12 and DPR 14.

The board decode logic determines the operation to be performed and signals the register select for appropriate register selection; while sequentially outputting code numbers to the DPR 14. When a preselected code number is received, the DPR notifies the host computer 12 to start inputting the data int the data buffer 18 and enables the DPR 14. The DPR permits the storage of logic of first and second designs whereby the user can issue operating system commands from the syntax of either system at any time. This arrangement enables the host computer to input a block of information into the DPR for encryption or decryption substantially independent of the encryption/decryption processor. The cipher processor obtains the information from the DPR for encryption or decryption and return through the DPR to the data buffer 18. The host computer then retrieves the encrypted or decrypted information from the DPR.

With respect to the second portion of the PCB. The key card reader provides the key data and name of the user to the key memory 22. The key interface and internal key interface 24 is connected to the key memory 22 for receiving the key and secondary key and user's name or identification. The CPU logic means 26 through its computer controls the operation of the second portion of the PCB, and has its address terminals connected by bus 54 to the address terminals of the DPR 14, key interface and internal key interface 24, DES encryption and CPU interface logic means 28, CPU address decoder 30, real time clock 32, battery backup RAM controller 34, CPU RAM 36 and CPU PROM 38 for producing addresses including addresses for the block of data to be received from the DPR and returned to the DPR 14.

The data terminal of the CPU Logic means 26 is connected by bus 56 to the data terminals of the real time clock 32, CPU RAM 36, CPU ROM 38 DES encryption and CPU interface Logic 28, DPR 14, and key interface and internal key interface means 24 for receiving the data from the DPR for encryption or decryption and for returning the encrypted or decrypte data to the DPR.

While, the control terminal of the CPU logic means 26 is connected to the control terminals of the real time clock 32, CPU RAM 36, CPU ROM 38, DES encryption and CPU interface logic means 28, and key interface and internal key interface means 24 and to the read/write terminal of the DPR 14 for controlling their operation to selectively receive the data for processing and return the processed data to the DPR.

The CPU address decoder 30 decodes the CPU addresses and has output terminals connected by leads 60, 62, and 64 to chip enable (CE) terminals of the DPR 14, battery backup RAM controller 34 and CPU PROM 38 for enabling the CPU PROM, CPU RAM AND DPR chips for initiating a program for the CPU, and allowing entry of the read/write signal into the DPR for initiating input of data into the CPU RAM for encryption or decryption and return of the processed data to the DPR.

A primary power backup for the CPU, RAMS and real time clock 66 is connected by lead 68 to the battery backup RAM controller 34. The RAM controller 34 has an output terminal connected by lead 70 to the chip enable terminal of the real time clok 32, and to a wait state means 72 for purposes hereinafter described.

The real time clock 32 in response to its inputs, above mentioned, keeps track of the time and date of access to the PCB and the length of time tee identified user has access to the PCB for an "audit rail" maintained in the key interface and internal E2 interface (key image buffer).

The wait state means 72 has an output terminal connected by lead 74 to a master clock, reset and ready logic means 76. As the real time clock 32 clocking intervals are much slower than those of the master clock (1 microsecond to 400 nanoseconds), when the real time clock is functioning, the wait state 72 stretches the CPU cycles. The master clock, reset and ready logic means 76 has an output terminal connected by lead 78 to a ready terminal of the CPU logic means 26 for setting the CPU logic means to a known condition for correct cooperation, and an output terminal connected by lead 80 to clock in terminals of the CPU logic means 26 for clocking operation of the CPU, the wait stte means 72 for stretching the processor cycles, and a DES clock synchronizer means 82 for synchronizing the clocking of the DES encryption chip.

The DES clock synchronizer 82 has an output terminal connected by lead 84 to a clock in terminal of the DES encryption and CPU interface logic means for synchronizing the operation of the DES chip with that of the CPU. This is necessary as the CPU chip run's twice as fast as the DES chip.

Referring now to FIGS. 2A-2D, more specifically the improved encryption printed circuit board 10 (FIG. 2B) includes the host computer PROM 12. The PROM has its data terminals BDO-BD7 connected to corresponding terminals of the data buffer 18 and first port of the DPR 14 for inputting and receiving information blocks of data, and its address terminals BA0-BA10 terminals connected to corresponding terminals of the DPR 14 address and control buffers 16 for storing the addresses of the data received from the address and control buffers 18 and returning the processed data using the host computer addresses. Preferably, the host computer PROM 12 may be an IBM or IBM compatible BIOS PROM number 27128 sold by INTEL Corporation, the DPR 14 an IDT 7130 sold by Integrated Device Technology, the address and control buffers 16 include a pair of 74 HCT244 buffers sold by Radio Corporation of America, and the data buffer 18 a 74HCT245 sold by Motorola Semiconductor Products, Incorporated.

Figure 2A:
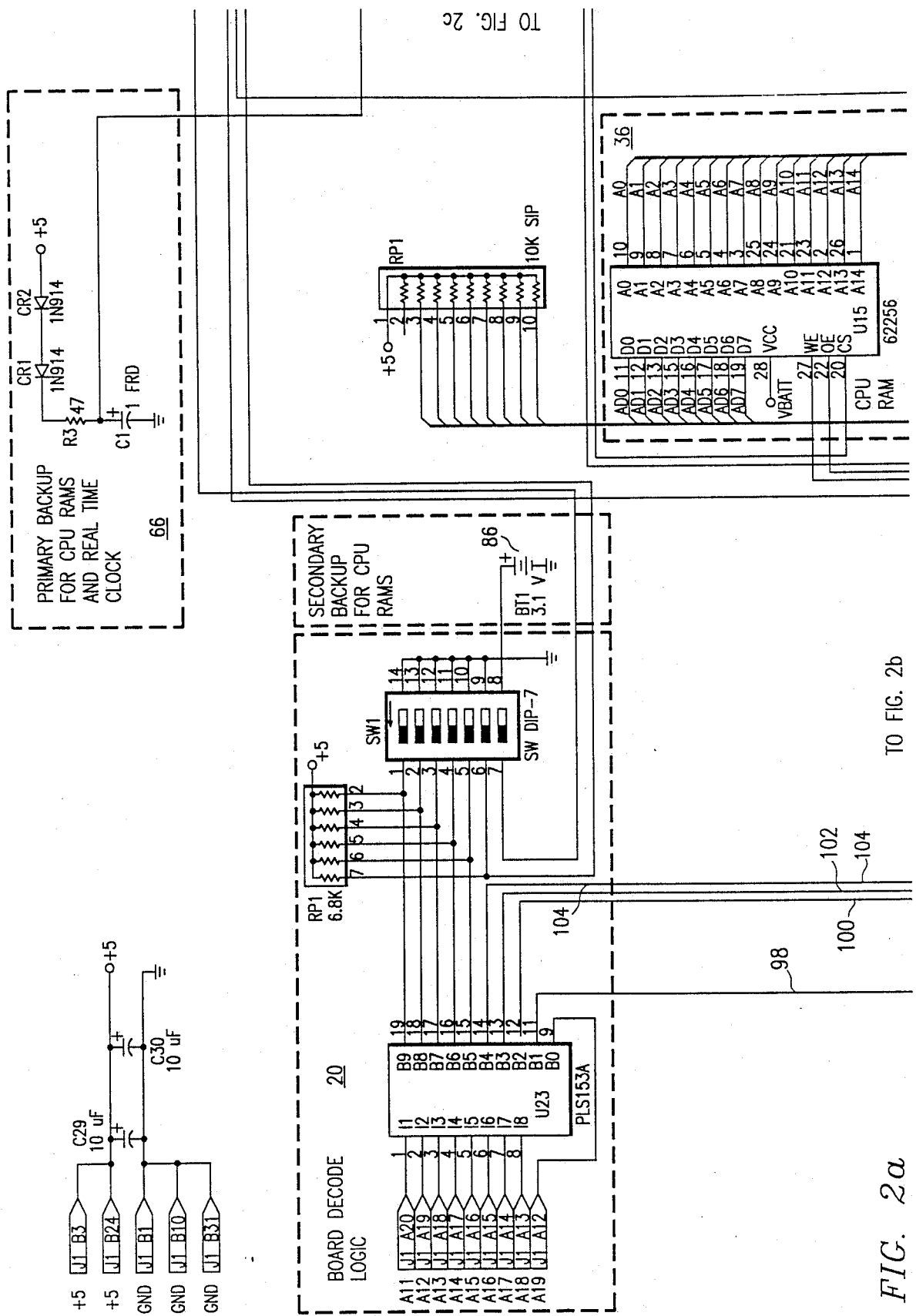
Figure 2B:
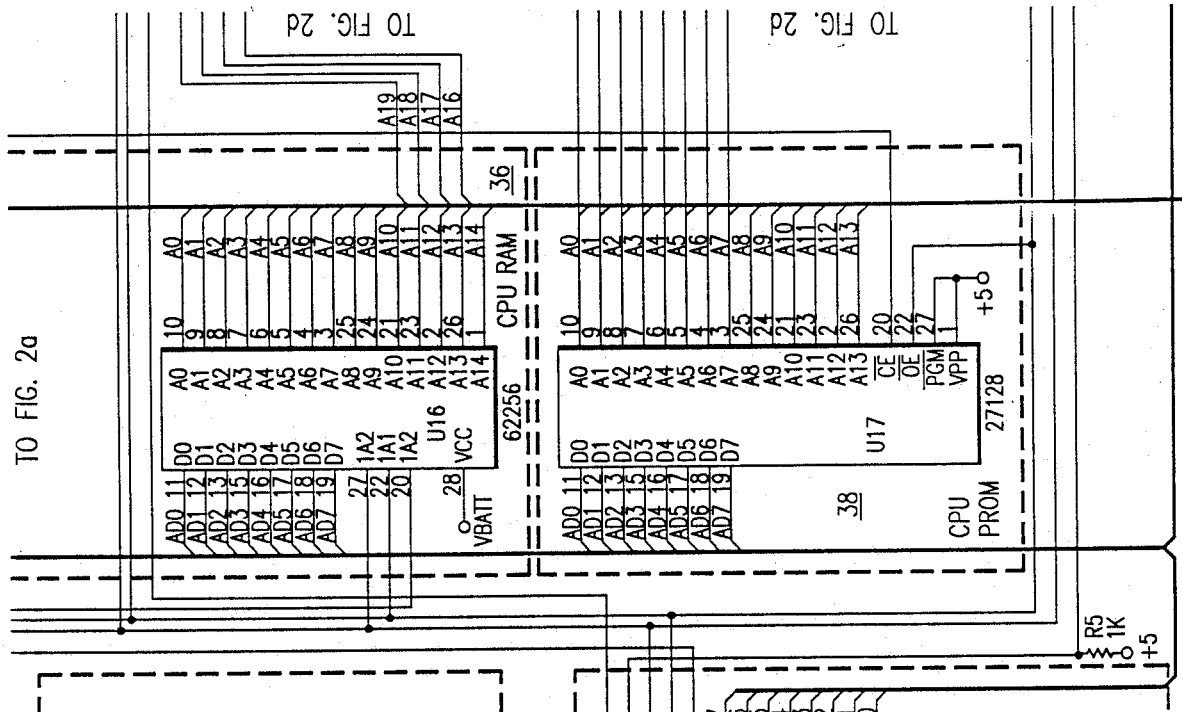
Figure 2B:
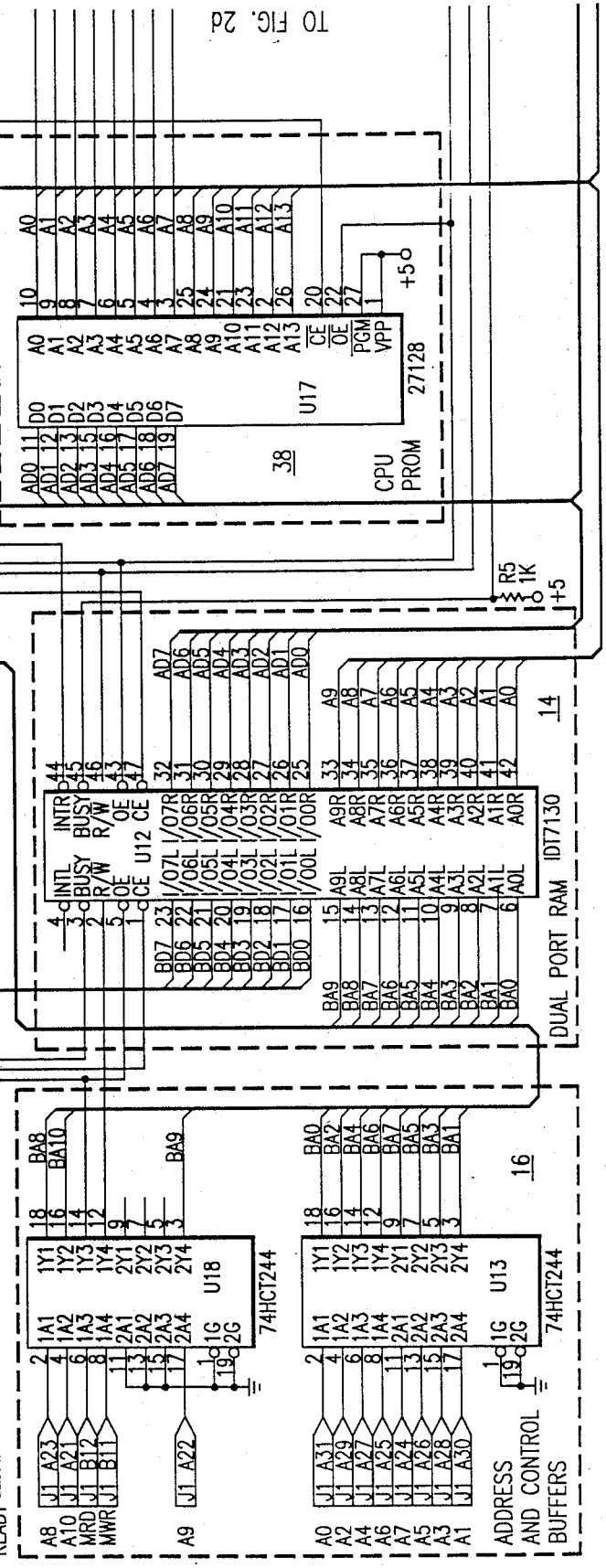
Figure 2B:
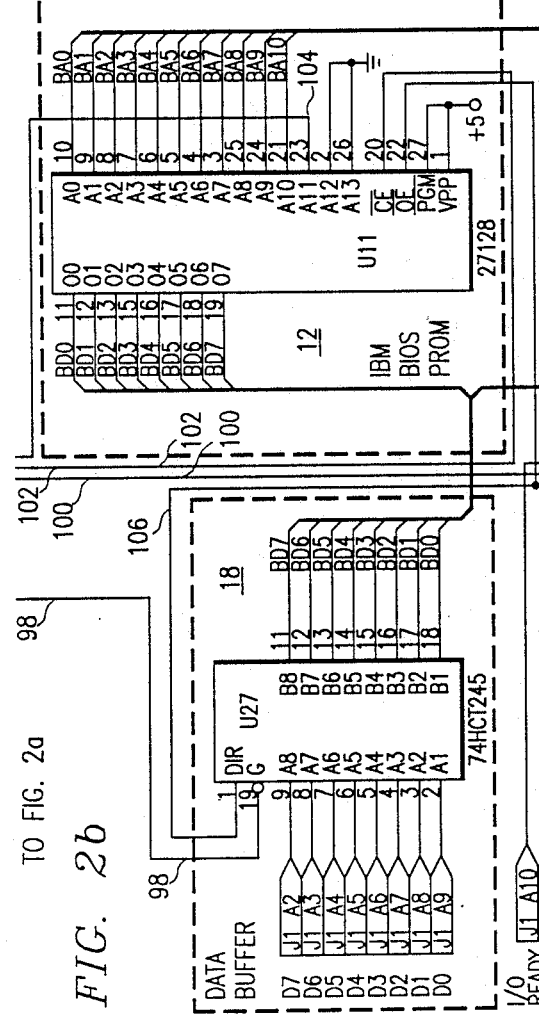

The board decode logic 20 (FIG. 2A) includes a PLS 153A infield logic circuit sold by Signetics Corporation. It has input pins connected as shown (FIG.. 2A) to voltage pull up resistors, and dip switches which allow the address of a block of port addresses (B5-B9) to be moved in the address space by setting a new value in the bank of dip switches. A dip switch 8 connects a battery 86 to the HSY2 and V+terminals across a poer divider connected to set the 2 terminal of a battery monitor 34 and first battery terminal of the battery backup RAM controller 34 (FIG. 2C). The battery monitor is an ICL 7665 sold by Intersel Corporation ad the backup RAM controller 34 is a DS1221 controller sold by Dallas Semioonductor Company.

The battery monitor 34' has its out2 terminal connected by lead 88 to the junction of a +5V power source and terminal 11 of the CPU address decoder 30. A primary backup power supply 66 is provided for the CPU RAMS and real time clock, and is connected to th second battery terminal of the battery backup RAM controller 34.

Figure 2D:
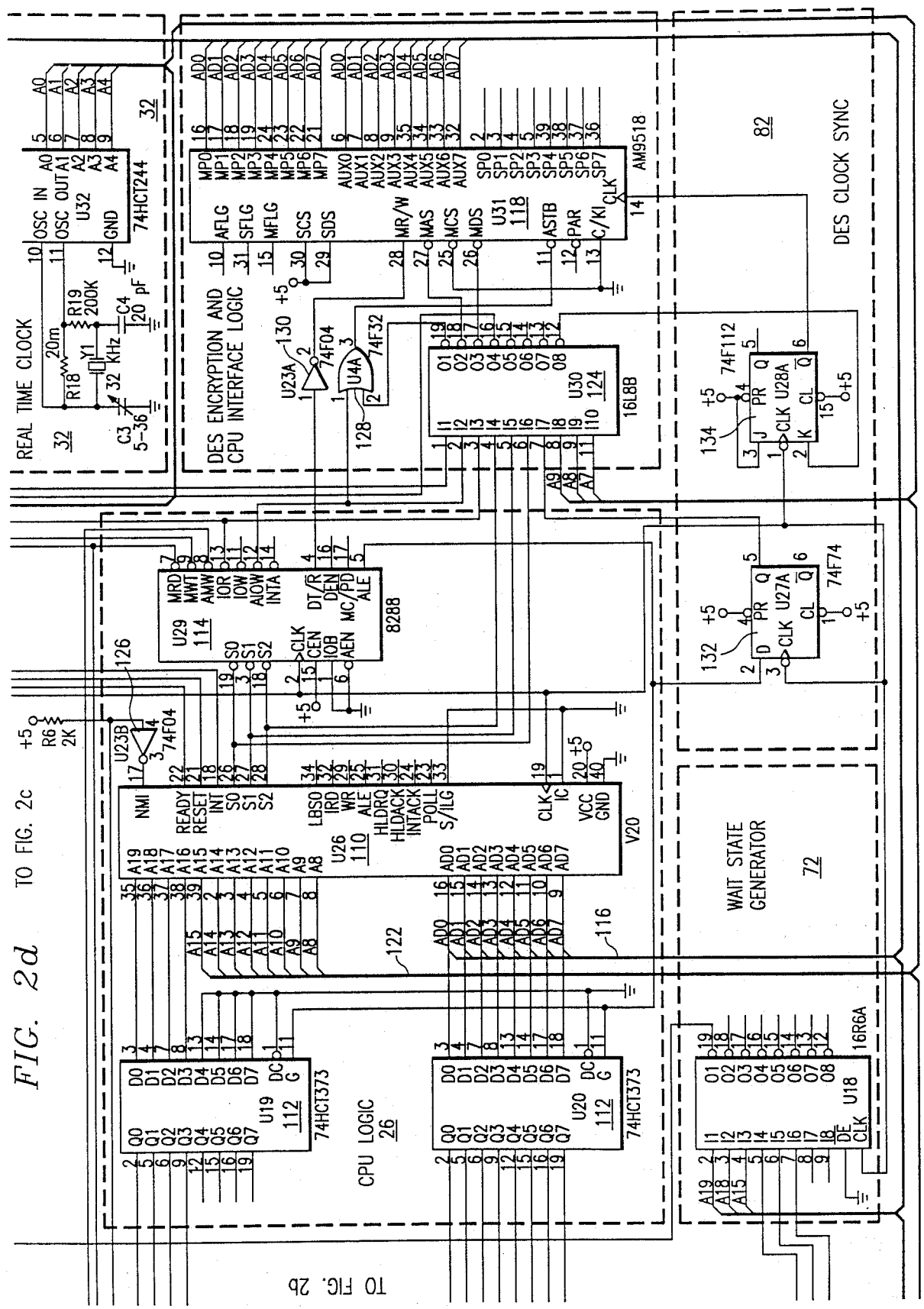

Chip enable CE0 and CE1 terminals of the power controller 34 are connected by leads 90 and 92, respectively, to the CS terminals of the CPU RAM 36 and the CPU PROM 38 (FIGS. 2B & 2C); while, the CE and CE2 terminals of the power controller 34 (FIG. 2C) are connected, respectively, by leads 94 and 96 to the D4 terminal of the CPU Address Decoder 30 and the CS terminal of the real time clock 32 (FIGS. 2C & 2D). Preferably, the CPU Address Decoder 30 (FIG. 2C) is a 20L8A PAL sold by Monolithic Memory Inc. and the real time clock is an MM58167A sold by National Semiconductor Company.

Returning to FIG. 2A, the board decode logic 20 has Bl-B4 terminals connected, respectively, by leads 98, 100, 102, and 104 to the enable (G) terminal of the data buffer 18 (FIG. 2B), the chip enable terminals of the DPR 14 and host computer PROM 12, and All terminal of the host computer PROM 12.

The data buffer 18 has its direction terminal connected by lead 106 to the direction enable terminals of the host computer PROM 12 and the DPR 14, and lY3 terminal of the address and control buffers 16 for controlling the data direction flow in and out of the PCB.

The DPR busy terminal of the first port is connected to the I/0 ready terminal to determine a wait state for the host computer.

The CPU logic means 26 (FIG. 2D) includes a CPU 110, transparent latches 112, and a CPU bus controller 114. Preferably, the CPU is a V20 microprocessor 110 sold by NEC Electronic, Inc. with pin connections as follows. The data addresses AD0-AD7 are connected to the junction of bus 116 and first half of the transparent latch 112, which is preferably a standard 74HCT373 for multiplexing the lower addresses and data (information). Bus 116 connects the AD0-AD7 terminals to corresponding terminals of the DPR 14 (FIG. 2B), CPU RAM 36, CPU ROM 38, corresponding encryption and decryption terminals of the cipher processor 118 (FIG. 2D) of the DES encryption and CPU interface logic means 28 and real time clock 32. The AD0 lead of bus 116 also connects the CPU AD0 pin to the data terminal of key interface driver 120 (FIG. 2C) of the external key interface and internal E-2 interface 24, and together with the AD1 lead to the CPU address decoder 30. The CPU RAM 36 (FIG. 2B) preferably includes two 62256 RAMS sold by NEC Electronics, and the CPU PROM 38 is a 27128 PROM sole by Intel Corporation. The cipher processor 118 is an AM9518 sold by Advanced Micro Devices, Inc.; the interface driver 120 is a standard 74HCT259, and the CPU address decoder 30 is a 20 L8A sold by Monolithic Memory, Inc.

The CPU also has upper address terminals A8-A19. An upper address bus 122 as leads for the addresses A8-A19 which include a lead interconnecting the A0 address pins of the DPR 14, CPU RAM 36, CPU PROM 38, CPU address decoder 30 and key interface driver 120; leads interconnecting the A1 and A2 address pins of the DPR, CPU RAM, CPU PROM and key interface driver; leads interconnecting the A3 and A4 address pins of the DPR, CPU RAM, and CPU PROM: a lead interconnecting address A5 pins of the DPR, CPU RAM, CPU PROM, real time clock 32, and CPU address decoder; a lead interconnecting address A6 pins of the DPR, CPU RAM, CPU PROM, and real time clock; a lead interconnecting address A7 pins of the DPR, CPU RAM, CPU PROM, CPU interface logic 124, real time clock and CPU address decoder; leads interconnecting address pins A8 and A9 for the DPR, CPU RAM, CPU PROM, CPU, CPU interface logic, real time clock, and CPU address decoder; leads interconnecting address pins A10-A13 of the CPU RAM, CPU PROM, and CPU; lead interconnecting address A14 pins of the CPU RAM AND CPU; lead interconnecting address A15 pins of the CPU, wait generator 72, and battery backup RAM controller; lead interconnecting address A16 pins of the CPU and CPU transparent latch 110; lead interconnecting address A17 pins of the CPU, transparent latch, and CPU address decoder; lead interconnecting address A18 pins of CPU, transparent latch, wait generator, CPU address decoder, and battery backup RAM controller; and lead interconnecting address A19 pins of the CPU, transparent latch, wait generator, and CPU address decoder.

The CPU 110 has output terminals NMI, INT, S0-S2, ready, reset and clock connected as follows: The NMI pin is connected through an inverter 126 to the junction of a +5V terminal and INTA pin of the DPR; the INT pin to the INT pin of the real time clock 32; S0-S2 pins to the S0-S2 pins of the CPU bus controller 114 and CPU interface 124; and the CLK pin to the CLK pins of the master clock 76, bus controller 114, DES clock synchronizer 82 and wait state generator 72.

The CPU bus controller 114 has output terminals MRD, MWT, AMW, IOR, AIOW, DT/R bar and ALE (address latch enable) connected as follows: the MRD pin to the junction of the DE pins of the CPU RAMS, DPR, CPU PROM, wait state generator, and RD pin of the real time clock; the MWT pin to the write pin of the real time clock; the AMW pin to the junction of WE pins of the CPU RAMS, DE pin of the DPR, CPU PROM, and wait state generator; IOR to junction of DES synchronizer 124, and CPU address decoder; AIOW to junction of pin 1 of OR gate 128 and DES CPU interface 124; DT/R through inverter 130 to MR/W of the cipher processor; and the ALE to the junction of the G (enable) pins of the transparent latches 112 and D pin of a flip/flop having its Q pin connected to the 17 pin of the DES CPU interface 124.

The CPU interface logic 124 of the DES encryption and CPU interface logic 28 output terminals 01-04 and 08 connected as follows: 01 to pin 2 of the OR gate 128 whose output is connected to the ATTB pin of cipher processor; 02 and 03, respectively, to the MAS (master port address strobe), and MDS (master port data strobe) pins of the cipher processor 118; 04 to the G pin of the key interface driver 120; and 08 to the K pin of JK flipflop of the DES clock synchronizer.

The cipher processor 118 has its remaining SCS and SDS (slave port chip select and data strobe) pins connected to a +5V terminal, and its MCS (master port chip select) pin connected to the junction of C/Kl pin and ground for multiplex operation.

The JK flipflop 134 has its Qbar output connected to the clock terminal of the cipher processor 118.

The operation of the improved encryption board can best be described in connection with the flow charts of FIGS. 3A-3D. Operation starts with a main loop routine 200 which when the host computer signals that information is to be read into or out of the encryption PCB instructions 202 and 204 are issued to set the busy flag in the dual port processor, and to initialize on the chip input/output (I/0) ports, respectively. Next, a decision 204 is made whether the reset flag has been set. If no, instructions 208, 210, 212, and 214 are issued to clear the DPR RAM, set the reset flag, load interrupt vector table, and call up the ROM initialization routine, respectively. If decision 206 is yes, jump is made to instruction 214 and the call is made for the ROM initialization routine (FIG. 3B).

At start 216 of the ROM initialization routine instructions 218, 220, and 222 are issued, respectively, to issue software reset command to the DES chip, clear the key read flag and initialize the audit trail pointers. After completion of ROM initialization return s made to the main loop routine (FIG. 2A) and instructions 216 and 218 are issued to clear the busy flag in the DPR and to call up the background subroutine (FIG. 3C).

At start 228 a decision 230 is made whether the physical key is present. If no, an instruction 232 is issued to clear the key read flag and repeat decision 230 until the decision is yes. When decision 230 is yes return is made to the main loop routine (FIG. 3A) and a decision 234 is made whether the command pending flag in the DPR is set. If no, return is made to the background routine (FIG. 3C) until the decision 234 is yes. When decision 234 is yes, an instruction 236 is issued to call up the ROM command routine (FIG. 3D).

Figure 3A:
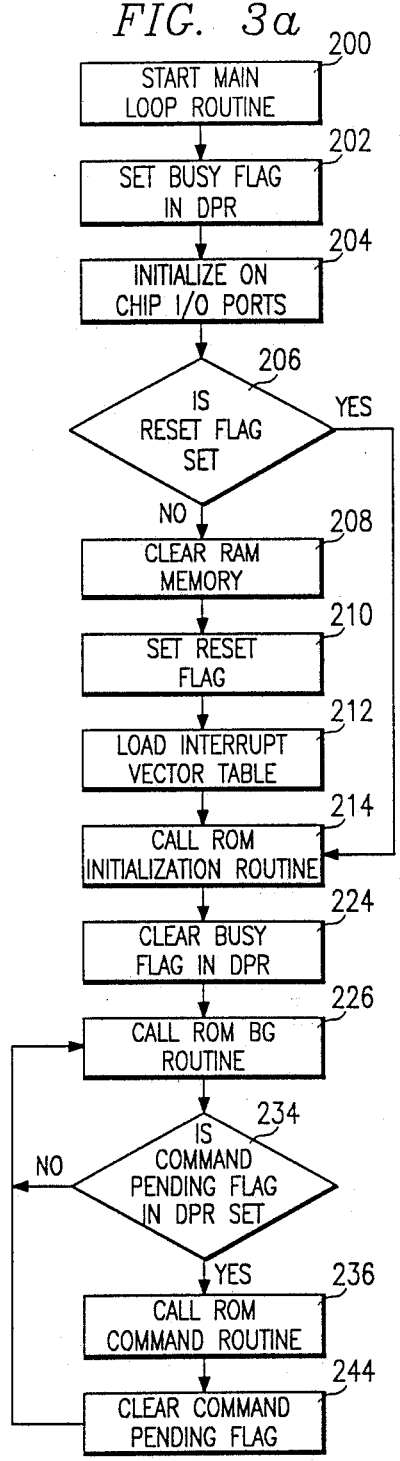
FIGS. 3A-3D constitute a flow chart for the operation of the encryption printed circuit board.
Figure 3B:
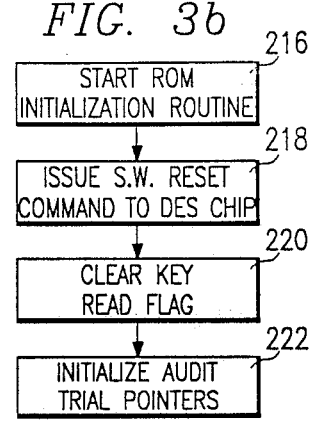
Figure 3C:
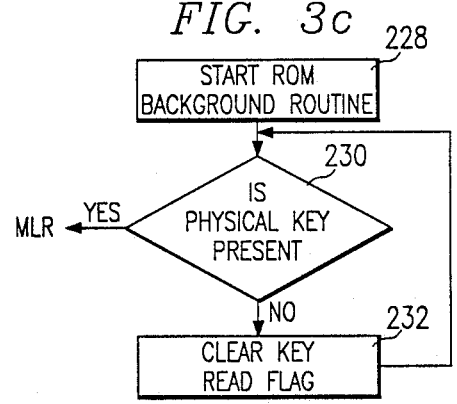
Figure 3D:
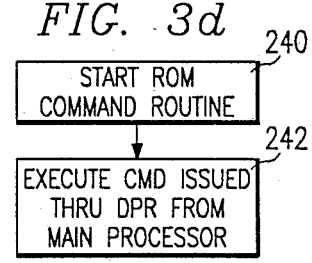

At start 240 of the ROM command routine (FIG. 3D) an instruction 242 is issued to execute the command issued through the DPR by the host processor and return is made to the main loop routine (FIG. 3A) and an instruction 244 is issued to clear the command pending flag and return is made to decision 234 and the command routine repeated until the execution of the commands of the host computer listed in FIG. 3E has been completed for the encryption and decryption of the information and creating the audit trail for those having access to the cohering printed circuit board.

For brevity acronyms used in the encryption and decryption commands are as follows:

DPR = Dual Port RAM
DES = Data Encryption Standard
IV = Initialization Vecoor
RTC = Real Time Clock Also decryption commands for the description mode are indicated by priming the encryption command designating letter(s).

When the host computer has information to be encrypted or decrypted, the encryption mode or the decryption mode, as appropriate, is selected for the DES chip. After the software reset command 218 of the start initialization routine (FIG. 3B) has been issued to reset the DES chip, a load DES master key command b. (b.') is issued to load the DES master key register with data from the DPR. This is followed by an encrypt master key command c. (c.') to encrypt data in the DPR using the DES master key register. Then a load clear encryption key command d. or a load clear decryption key command (d.') is issued to load the DES encryption key or decryption key register with a clear key from the DPR and a load encrypted encryption key command e. or a load encrypted decryption key command (e.') issued to load the DE encryption or decryption key register with an encryption or decryption key from the DPR. Next, a load clear IV encryption command f. or a load clear IV decryption command (f.') is issued to load the DES encryption or decryption IV register with a clear IV from the DPR, and then a load encrypted IV encryption command g. or a load encrypted IV decryption command (g.') is issued to load the DES encryption IV register with an encrypted IV from the DPR.

After loading the DES encryption IV encryption or decryption registers, a read clear IVE command h. or a read clear IVD command (h') is issued to send the DES encryption or decryption IV register clear to the DPR: this is followed by a read encrypted IVE command i. or read encrypted IVD command (i.') to send the DES encryption IV register encrypted to the DPR.

Next, after the decision 230 (FIG. 3C) is made whether a physical key is present a key present command j. (j.') is issued to send the physical key present status to the DPR. Then a key changed command k. (k.') is issued to send the key read flag to the DPR, after which write and read physical key commands 1. (1.') and m. (m.') are issued to write the physical key from the KIB and read the physical key to the IB.

The DES PCB is now ready to receive information for creating an audit trail. The audit trail is a record of the name of the person accessing the DES PCB, the date and time of access, and the length of time the person has access to the DES PCB.

For the audit trail, a clear audit trail command n. (n.') and a write audit rail command o. (o.') are issued to clear the audit trail pointers in the CPU RAM and to write to the next audit trail buffer location from the DPR. Then a reset audit trail command p. (p.') is issued to reset the audit trail read pointer, and a read audit trail command q. (q.') is issued to read from the next audit trail buffer location to the DPR. The DES PCB is now ready to create the audit trail as follows.

A write name command r. (r.') is issued to load the user's name in the KIB from the DPR. A read name command s. (s.') is then issued to send the user's name in the KIB to the DPR. Next, write password and valid password commands t. (t.') and u. (u.') are issued to load the user password in the KIB from the DPR and to compare the user password in the KIB to that of the DPR. If identical, write flags and read flags commands v. (v.') and w. (w.') are issued to load the user flags in the KIB from the DPR and to send the user flags in the KIB to the DPR.

Next, write and read ID code commands x. (x.') and y. (y.') are issued to load the user ID code in th KIB from the DPR and to read the user ID code in the KIB to the DPR. This is followed by a write user key command z. (z.') to load the user primary key and IV in the KIB from the KIB. Next, either a load user key command aa. is issued to load the DES encryption key register from the user primary key in the KIB and to load the DES encryption IV register from the user primary IV in the KIB, or a load user key command (aa.') is issued to load the DES decryption key register from the user primary key in the KIB and to load the DES decryption IV register from the user primary IV in te KIB. Then a create user audit key command bb. bb.') and a read user audit key command cc. (cc.') are issued, respectively, to load the user audit key in the KIB from the DPR and encrypt the user audit key in the KIB using the audit register, and to send the encrypted audit key to the DPR. These commands are followed either by an encryption load user audit key command dd. to load the DES master key from the audit register and load the DES encryption key register with an encrypted key from the DPR, or a decryption load user audit key command (dd.') command to load the DES master key from the audit register and load the DES decryption key register with an encrypted key from the DPR.

Next, a user master key is created by a create user master key command ee. (ee.') to load the user master key in the KIB from the DPR and encrypt the user master key in the KIB using the master register. Then read user master key command ff. (ff.') is issued to send the encrypted user master key to the DPR. Next, either a load user master key command gg. is issued to load the DES master key from the master register, and lad the DES encryption key register with an encrypted key from the DPR or a load master key command (gg.') is issued to load the DES master key from the master register and load the DES decryption key register with an encrypted key from the DPR.

To provide auditors access only for auditing the audit trail auditor keys are provided. The auditor keys are entered pursuant to write audit key, save audit key, copy audit key and load audit key commands hh. (hh.'), ii. (ii.'), and jj. (jj.'), respectively, to load the audit key in the KIB from the DPR, load the audit register with the audit key in the KIB, and load the audit key in the KIB with the audit register. Then either a create user master key command kk. command is issued to load the DES encryption key register from the audit key in the KIB, or a create user aaster key command (kk.') is issued to load the master register and load the DES decryption key register with an encrypted key from the DPR.

To provide supervisor entry only to certain information, supervisor keys are provided. The supervisor keys are entered pursuant to write master key, save master key, copy master key and load master key commands 11. (11.'), mm. (mm.'), nn. (nn.'), and oo. (oo.'), respectively, to load the master key in the KIB from the DPR, load the master register with the master key in the KIB, load the master key in the KIB with the master register, and load the DES encryption key register from the master key in the KIB.

To provide for limited user system access, i.e. use by persons only at user designated stations, system keys are used. System keys are provided by write system key, save system key, copy system key, and load system key commands pp. (pp.'), qq. (qq.'), rr. (rr.'), and is. (is.'), respectively, to load the system key in the KIB from the DPR, load the system register with the system key in the KIB, load the system key in the KIB with the system register, and load the DES encryption key register from the system key in the KIB, or lod the DES decryption key register from the system key in the KIB.

After the user gains access, the data entered into the data buffer from the host computer is read incrementally into the DPR and encrypt data or decrypt data commands tt. or (tt.') issued, either to encrypt data in the DPR using the count and mode supplied by the DPR or decrypt data in the DPR using the count and mode supplied by the DPR.

To determine whether a key is valid a valid key command uu. (uu.') is issued to checksum the KIB and verify if correct to the DPR.

To write and read the time, write clok and read clock commands vv. (vv.') and ww. (ww.') are issued to load the RTC from the DPR, and send the RTC to the DPR.

To separate the files for individual accessing for encryption or decryption an auxiliary key is provided. To write and load the auxiliary key for encryption, write auxiliary key and load auxiliary key commands xx. (xx.') and yy. (yy.') are issued to load the user secondary key and IV in the KIB from the DPR, and either to load the DES encryption key register from the user secondary key in the KIB and load the DES encryption IV register from the user secondary IV in the KIB. While for decryption command (yy.') is issued to load the DES decryption key register from the user secondary key in the KIB, and load the DES decryption IV register from the user secondary IV in the KIB, or to load the DES decryption key register from the user secondary key in the KIB and load the DES decryption IV register from the user secondary IV in the KIB.

To read the user system key a read user system key command zz. (zz.') is issued to load DES master key with the system key in the KIB and send the user key in the KIB (encrypted with system key) to the DPR. To load the user system key for encryption a load user system key command aaa. is issued to load the DES master key from the system key in the KIB and load the DES encryption key register with an encrypted key from the DPR. While to load the user system key for decryption a load user system key command (aaa.') is issued to load the DES master key from the system key in the KIB and to load the decryption key register with an encrypted key from the DPR.

Finally for creating the user date for both encryption and decryption, write and read created date commands bbb. (bbb.') and ccc. (ccc.') are issued to load the user created date in the KIB from the DPR, and to send the user created date in the KIB from the DPR.

Although a single embodiment of the invention has been described, it will be apparent to a person skilled in the art that various modifications to the details of construction shown and described may be made without departing from the scope of this invention.

What is claimed is:

1. An encryption/decryption apparatus for a host computer having expansion slots for an expander board comprising:

an expander board for connection to a host computer's expansion slot, said expander board including first and second portions, and a dual port means having ports connected to the first portion and ports connected to the second portion and a storage means for storing information received from the first and second portions, said dual port means allowing the simultaneous existence of the host computer's operating system and the second portion's operating system using operating system commands from the syntax of either system at any time;

the first portion including means connected to the host computer for receiving an storing information, means connected to the hot computer for storing addresses for the information, and means connected to the host computer for completing logic functions for processing information through the first portion into the dual port means for encryption or decryption by the second portion and outputting encrypted or decrypted information from the dual port means to the host computer; and The second portion including a first means for storing an encryption/decryption key, second means for selectively encrypting and decrypting information, and a third means connected to the first means and dual port means for fetching, respectively, the encryption/decryption key and information, inputting the encryption/decryption key and information into the second means for encryption or decryption, and returning the encrypted or decrypted information to the dual port means for retrieval by the first portion and input to the host computer.

2. An encryption/decryption apparatus according to claim 1 wherein the second portion further includes a real time clock, the first means for storing an encryption/decryption key further includes means for storing an audit trail, and said third means is a central processing means including means connected to said real time clock and dual port means of fetching, respectively, the date and time and same of the user, means for determining the length of time the user has access to the encryption/decryption apparatus, and means for storing the user's name date and time of accessing the nncryption/decryption apparatus and the length of access time in the means for storing an audit trail in the first means for creating an audit trail.

3. An encryption/decryption apparatus according to claim 2 wherein the first means for storing an encryption/decryption key includes an auditor's key, and the central processing means further includes means for fetching the auditor's key from the first means and a user's key from the host computer, and means for comparing the keys for limiting access only to the audit trail storage means.

4. An encryption/decryption apparatus according to claim 1 wherein the first means for storing an encryption/decryption key further includes a secondary key and the third means includes means for fetching the secondary key for comparison with a user input key and means for limiting access to a file associated with the secondary key for eliminating file linkage.

5. An encryption/decryption apparatus according to claim 1 wherein the first means for storing an encryption/decryption key includes a supervisor key, and the third means includes means for fetching the supervisor key for comparison with a user's key for limiting access to files associated with the supervisor key.

6. An encryption/decryption apparatus according to claim 1 wherein the first means for storing an encryption/decrypiion key further includes a user system key and the third means includes means for fetching the user system key for comparison with a user's key for restricting user access to selected system stations.

7. An encryption/decryption apparatus according to claim 1 wherein the means connected to the host computer for completing logic functions further includes means for enabling the first and second portions of the encryption/decryption apparatus.

8. An encryption/decryption apparatus according to claim 1, wherein the dual port means includes busy indicating terminals and the first and second portions includes means connected to busy terminals for indicating the wait status of the first and second portions.

9. An encryption/decryption apparatus according to claim 8, wherein the means connected to the host computer for receiving and storing information includes means for storing a block of information, and means of inputting portions of the block of information into the storage means of the dual port means sequentially for the second portion.

10. An encryption/decryption apparatus according to claim 2 wherein the real time clock operates at a fixed rate, the second portion's second means for selectively encrypting and decrypting information includes a clock means operating at a fixed rate different from that of the real time clock, and the central processing means includes a master clock operating at a fixed rate different from that of the real time clock and second means clock, and wherein the second portion further includes means connected t the central processing means, real time clock, and second means for synchronizing the operations thereof with respect to one to another.

* * * * *